United States Patent
Paquette et al.

(10) Patent No.: US 11,287,171 B1
(45) Date of Patent: Mar. 29, 2022

(54) HEAT SWITCHES FOR CONTROLLING A FLOW OF HEAT BETWEEN THERMAL STAGES OF A CRYOSTAT

(71) Applicant: Rigetti & Co, LLC, Berkeley, CA (US)

(72) Inventors: Jean-Philip Paquette, Berkeley, CA (US); Damon Stuart Russell, Pasadena, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 97 days.

(21) Appl. No.: 16/028,318

(22) Filed: Jul. 5, 2018

Related U.S. Application Data

(60) Provisional application No. 62/528,859, filed on Jul. 5, 2017, provisional application No. 62/528,831, filed on Jul. 5, 2017.

(51) Int. Cl.
| | |
|---|---|
| *F25D 19/00* | (2006.01) |
| *F25D 3/10* | (2006.01) |
| *G05D 23/01* | (2006.01) |
| *H01F 6/04* | (2006.01) |
| *F28F 13/00* | (2006.01) |

(52) U.S. Cl.
CPC ............ *F25D 19/006* (2013.01); *F25D 3/10* (2013.01); *F28F 13/00* (2013.01); *G05D 23/01* (2013.01); *H01F 6/04* (2013.01); *F28F 2013/008* (2013.01)

(58) Field of Classification Search
CPC ...... F25D 19/006; F25B 9/14; F28F 2013/008
See application file for complete search history.

(56) References Cited

U.S. PATENT DOCUMENTS

| | | | | |
|---|---|---|---|---|
| 4,770,004 A | * | 9/1988 | Lagodmos | F17C 13/00 165/185 |
| 4,781,033 A | | 11/1988 | Steyert et al. | |
| 5,398,511 A | * | 3/1995 | Inaguchi | F25B 9/14 62/6 |

(Continued)

FOREIGN PATENT DOCUMENTS

| | | |
|---|---|---|
| JP | 07253472 | 10/1995 |
| JP | 1174572 | 3/1999 |
| JP | 11325629 | 11/1999 |

OTHER PUBLICATIONS

JPH1174572 Translation (Year: 1999).*

*Primary Examiner* — Brian M King
(74) *Attorney, Agent, or Firm* — Henry Patent Law Firm PLLC

(57) ABSTRACT

Heat switches are presented herein for controlling a flow of heat between thermal stages of a cryostat. In one aspect, a heat switch for a cryostat includes a thermal linkage configured to simultaneously contact a first thermal stage and a second thermal stage of the cryostat and define a thermal pathway therebetween. The thermal linkage includes a superconducting element disposed along a portion of the thermal pathway that is capable of transitioning between a superconducting state and a non-superconducting state. A thermal conductivity of the superconducting state is lower than a thermal conductivity of the non-superconducting state. Other types of heat switches are presented, including methods for controlling a flow of heat between thermal stages of a cryostat.

29 Claims, 7 Drawing Sheets

(56) References Cited

U.S. PATENT DOCUMENTS

| | | | |
|---|---|---|---|
| 2002/0121098 A1* | 9/2002 | Baker, III | F25B 21/04 62/3.7 |
| 2003/0106326 A1* | 6/2003 | Sekimoto | F17C 3/085 62/51.1 |
| 2009/0007573 A1 | 1/2009 | Noonan et al. | |

* cited by examiner

HEAT SWITCHES FOR CONTROLLING A FLOW OF HEAT BETWEEN THERMAL STAGES OF A CRYOSTAT

CROSS-REFERENCE TO RELATED APPLICATIONS

This application claims priority to U.S. Provisional Application Ser. No. 62/528,831 entitled "Superconducting Heat Switch for Thermally Linking Temperature Stages of a Cryostat", filed Jul. 5, 2017, and to U.S. Provisional Application Ser. No. 62/528,859 entitled "Mechanical Heat Switch for Thermally Linking Temperature Stages of a Cryostat", also filed Jul. 5, 2017. The disclosure of each priority application is hereby incorporated herein by reference.

BACKGROUND

The following description relates to heat switches, and more particularly, heat switches for controlling a flow of heat between thermal stages of a cryostat.

Cryostats are commonly used to expose devices and samples to environments of very low temperature (e.g., T<120 K). Such environments are thermally-isolated through insulating walls and are evacuated environments, typically having a pressure in the range of $10^{-3}$ mbar to $10^{-9}$ mbar, thereby allowing the cryostats to operate at stable temperatures without appreciable thermal losses. Advanced cryostats may include multiple thermal stages, each configured to operate at a respective temperature. Spatial sequences of thermal stages may be configured to allow sequentially-adjacent thermal stages to operate at progressively lower temperatures. The cooldown of a cryostat can be a very time consuming process and structures and methods for reducing cooldown time are desired.

DETAILED DESCRIPTION

Figure 1:
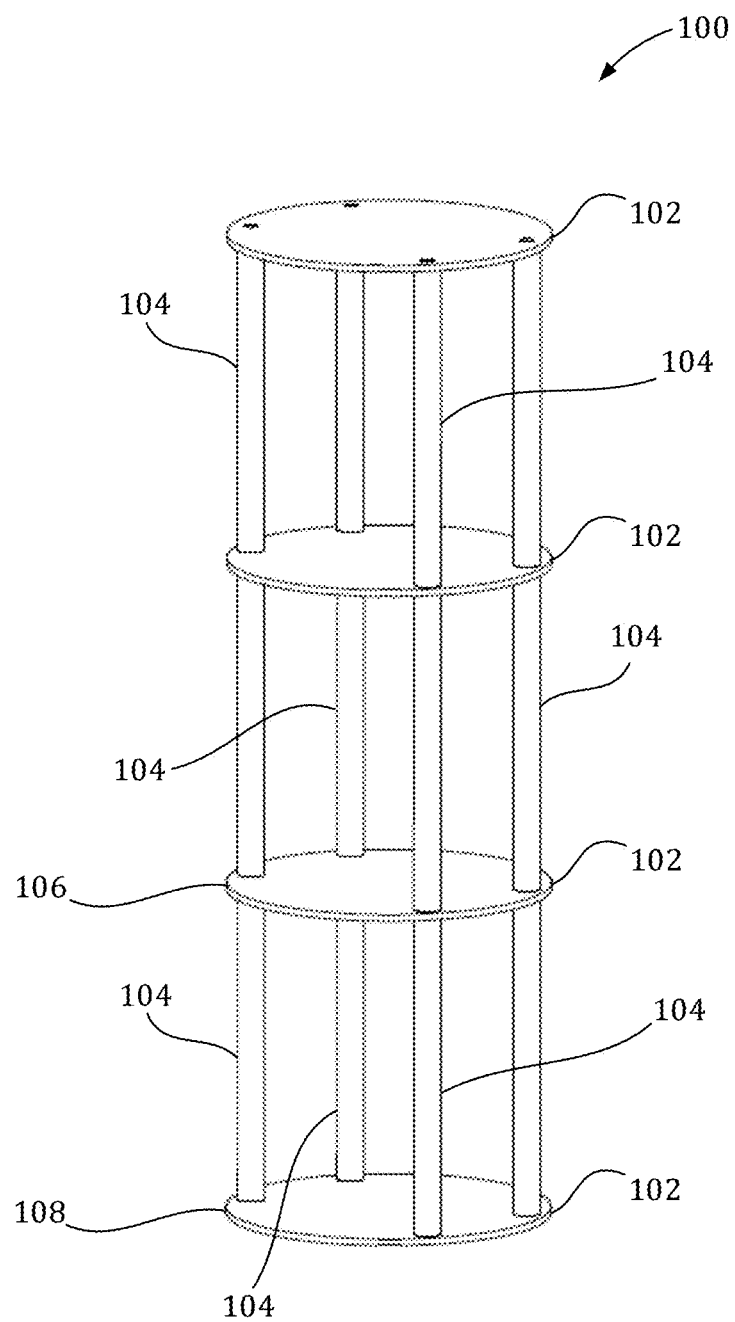
FIG. 1 is a schematic diagram, shown in perspective, of an example cryostat having a plurality of thermal stages.

To achieve very low temperatures, cryostats may employ an outer jacket of cryogenic liquid (e.g., dry-ice in acetone, liquid nitrogen, liquid helium, etc.) in combination with an inner evacuated chamber that incorporates one or more "dry" refrigeration systems (e.g., a pulse tube refrigeration unit, a $^3$He/$^4$He dilution refrigeration unit, etc.). Devices or samples may be disposed on one or more thermal stages, which in turn, are enclosed within the inner evacuated chamber. The cryostats may be configured to thermally-couple such refrigeration systems to one or more thermal stages, thereby allowing the cryostats to operate the one or more thermal stages at a distribution of temperatures. In many instances, the refrigeration systems are thermally-associated with two or more thermal stages to produce a distribution of progressively decreasing temperatures.

For example, a cryostat may include a first thermal stage (or grouping of first stages) and a second thermal stage (or grouping of second stages). A pulse tube refrigeration unit may extract heat from the second thermal stage (or grouping of first stages), which serves as a heat source, and deposit the heat in a second thermal stage (or grouping of second stages), which serves as a heat sink. The second thermal stage thus decreases in temperature relative to the first thermal stage and provides a basis to create a distribution of progressively decreasing temperatures (e.g., using a third thermal stage, a fourth thermal stage, and so forth).

To prevent flows of heat from transferring undesirably between thermal stages, cryostats commonly incorporate structural supports of high thermal resistance. The structural supports space the thermal stages apart to produce a spatial sequence of thermal stages with the cryostats. These structural supports, when combined with the thermal mass of other components in the cryostats, impart thermal lag to the cryostats during operations of cooling and warming. The thermal lag may also hinder adjustments to the operating temperatures of individual thermal stages, such as may be required to bring a device or sample to a target temperature. Mitigating this thermal lag improves set-up times for the cryostats and may also improve times necessary to adjust one or more thermal stages to new operating temperatures.

The embodiments presented herein are directed to heat switches for cryostats that control a flow of heat between thermal stages thereof. The heat switches are operable to selectively transition between an "on" state, where heat flows from a heat source to a heat sink, and an "off" state, where the flow of heat is substantially reduced or eliminated. The heat source and the heat sink may each correspond to one or more thermal stages in a cryostat (e.g., a spatial sequence of thermal stages within the cryostat), a device or sample on a thermal stage, or some combination thereof. Heat flows along a warm-to-cool temperature gradient and at a magnitude driven by a temperature difference between the heat source and the heat sink.

In one aspect, a heat switch for a cryostat includes a thermal linkage configured to simultaneously contact a first thermal stage and a second thermal stage of the cryostat and define a thermal pathway therebetween. The thermal linkage includes a superconducting element disposed along a portion of the thermal pathway that is capable of transitioning between a superconducting state and a non-superconducting state. A thermal conductivity of the superconducting state is lower than a thermal conductivity of the non-superconducting state.

In another aspect, a heat switch for a cryostat includes a thermal linkage having a first surface configured to contact a first thermal stage of the cryostat and a second surface configured to contact a second thermal stage of the cryostat. The thermal linkage is operable to selectively move between a first position, where the thermal linkage simultaneously contacts the first thermal stage and the second thermal stage and defines a thermal pathway therebetween, and a second position, where the thermal linkage is not contact with at least one of the first thermal stage and the second thermal stage and the thermal pathway is broken.

Now referring to FIG. 1, a schematic diagram is presented in perspective of an example cryostat 100 having a plurality of thermal stages 102. The plurality of thermal stages 102 may correspond to radiation shields, thermalization plates, or both. The plurality of thermal stages 102 may be formed of a material having a high thermal conductivity at cryogenic temperatures, such as below 120 K. For example, the plurality of thermal stages 102 may be formed of a material having a thermal conductivity of at least 1 W/(m·K) as measured at 4 K. It will be appreciated that such high thermal conductivity allows the plurality of thermal stages 102 to mitigate the development of temperature gradients, thereby maintaining a substantially uniform temperature across their respective masses. Examples of materials for the plurality of thermal stages include oxygen-free high conductivity copper and its alloys (e.g., C101 copper alloy).

The cryostat 100 may include any number of thermal stages 102 to support devices and samples for cryogenic refrigeration. As a result, the cryostat 100 may position the plurality of thermal stages 102 to define a spatial sequence of thermal stages, such as a in linear sequence or an angular sequence. FIG. 1 depicts four thermal stages 102 in an equally-spaced linear sequence. However, this depiction is not intended as limiting. In general, the cryostat 100 may include any number and spacing of thermal stages 102 as needed. To achieve such configurations, the cryostat 100 may include one or more structural supports 104 to position the plurality of thermal stages 102 into the spatial sequence of thermal stages. The structural supports 104 may be formed of a material having a low thermal conductivity at cryogenic temperatures, i.e., less than 0.5 W/(m·K) at or below 50 K, such as a stainless steel alloy or a glass-epoxy laminate of G10 grade. The structural supports 104 thus additionally impede a flow of heat between the plurality of thermal stages 102. As such, the cryostat 100 may include one or more thermal stages dedicated to a specific temperature during operation. For example, the cryostat 100 may be configured such that each thermal stage operates at a progressively decreasing temperature as a depth of the cryostat increases.

The cryostat 100 may also include one or more refrigeration systems thermally-coupled to each of the thermal stages 102 (not shown). For example, the cryostat 100 may include a pulse-tube refrigeration system coupled to a second-lowest thermal stage 106 and a $^3$He/$^4$He dilution refrigeration system thermally-coupled to a lowest thermal stage 108. The refrigeration systems establish specific operating temperatures for the thermal stages to which they are respectively thermally-coupled. In doing so, the refrigeration systems may define a distribution of operating temperatures along the spatial sequence of thermal stages.

During operation, the cryostat 100 is cooled and heated to thermally affect devices and samples disposed on the plurality of thermal stages 102. Such cooling and heating may also be part of processes to maintain the cryostat 100. However, a rate of cooling and heating may be limited by the structural supports 104, whose thermal resistance retards heat flows through the cryostat 100 (e.g., between adjacent thermal stages). As such, the cryostat 100 may experience thermal lag during cooling and heating, and sometimes substantially so. It will be appreciated that the heat switches disclosed herein are capable of reducing such thermal lag by controllably establishing heat flows, and in particular selectively controlling a direction of heat, between thermal stages 102 along the spatial sequence of thermal stages.

Furthermore, refrigeration systems commonly have different cooling capacities (i.e., a rate at which heat may be extracted from a thermally-coupled body), and these cooling capacities are often optimal over non-overlapping temperatures (or poorly overlapping). These non-overlapping temperatures may prevent two thermal stages—each thermally-coupled to a different refrigeration system—from reaching a target operating temperature at approximately the same time, especially if the two thermal stages are thermally-coupled to different types of refrigeration systems. The heat switches disclosed herein are capable of reducing this type of thermal lag by selectively opening a thermal pathway between the two thermal stages, thereby allowing the higher-capacity refrigeration system to assist the lower-capacity refrigeration system.

For example, a pulse-tube refrigeration unit may be configured to optimally extract heat at temperatures to about 4 K and a $^3$He/$^4$He dilution refrigeration unit may be configured to optimally extract heat at temperatures below 1 K. The pulse-tube refrigeration unit may be thermally-coupled to the lowest thermal stage 108 and the second-lowest thermal stage 106 and used to pre-cool these two thermal stages to about 4 K. The $^3$He/$^4$He dilution refrigeration unit may be thermally-coupled the lowest thermal stage 108 and used to cool the lowest thermal stage 108 to temperatures below 1 K. However, cooling of the lowest thermal stage 108 by $^3$He/$^4$He dilution refrigeration unit occurs after pre-cooling of the lowest thermal stage 108 and the second-lowest thermal stage 106 by the pulse-tube refrigeration unit.

Thermal coupling between the second-lowest thermal stage 106 and the lowest thermal stage 108 influences a rate of heat transfer between the two thermal stages during cooling. Thermal coupling based on a high thermal conductivity pathway will increase the rate of heat transfer and decrease an overall time required to cool the cryostat. For example, if the second-lowest thermal stage 106 is thermally-coupled to the pulse-tube refrigeration unit through a high thermal conductivity pathway, the second-lowest thermal stage 106 may cool to 4 K at an acceptable rate during operation. However, if the cryostat relies solely on the structural supports 104 for thermal coupling to the lowest thermal stage 108, the overall time required to cool the lowest thermal stage 108 to 4K is not optimal as the structural supports 104 are formed of low thermal conductivity material. As a result, the lowest thermal stage 108, which is thermally-coupled to the $^3$He/$^4$He dilution refrigeration unit, reaches a target temperature later than the second-lowest thermal stage 106, which is thermally-coupled to the pulse-tube refrigeration unit. (The $^3$He/$^4$He dilution refrigeration unit typically has a lower cooling capacity above 4 K than the pulse tube refrigeration unit.) This time difference is referred to herein as the thermal lag.

The heat switches disclosed herein may reduce this thermal lag by establishing a temporary thermal "short circuit" between the lowest thermal stage 108 and the second-lowest thermal stage 106, thereby allowing the pulse-tube refrigeration unit to more efficiently cool down the cryostat prior to starting the $^3$He/$^4$He dilution refrigeration unit.

Figure 2A:
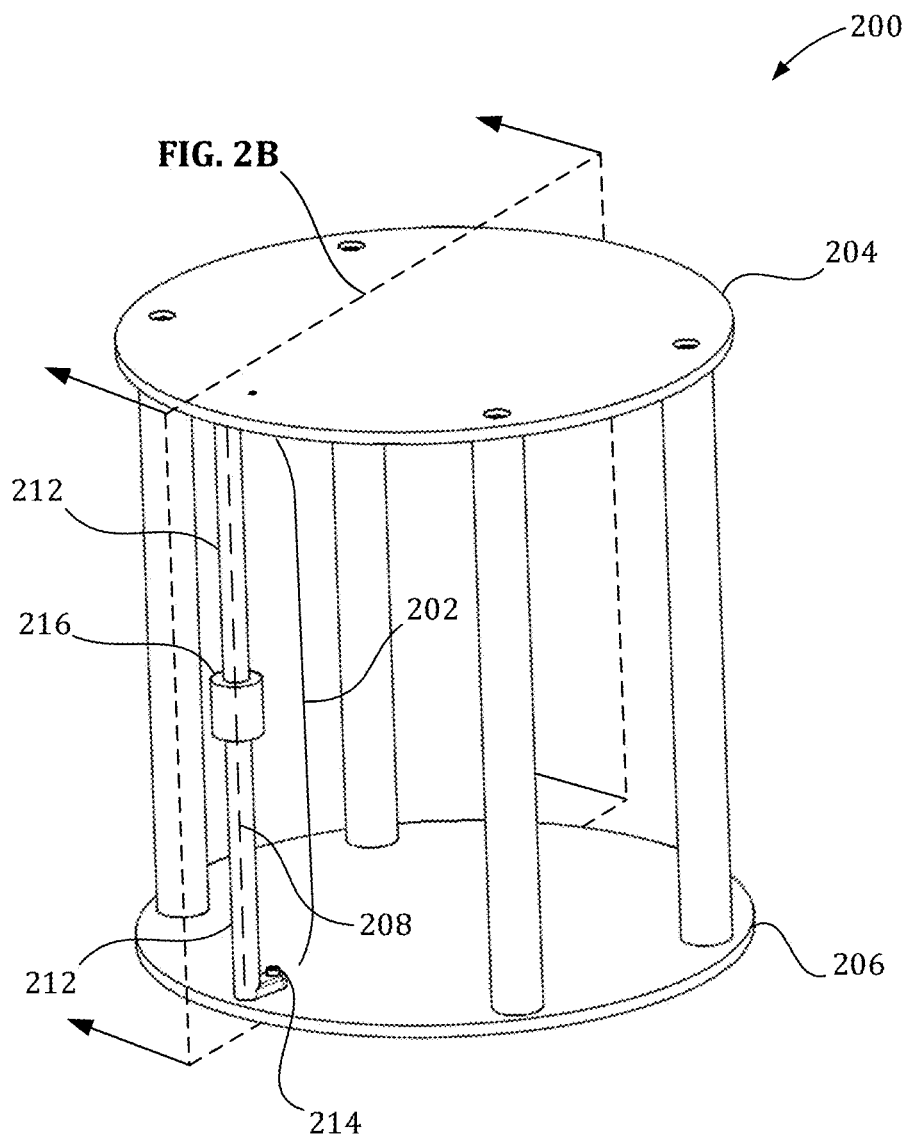
FIG. 2A is a schematic diagram, shown in perspective, of an example heat switch for a cryostat.
Figure 2B:
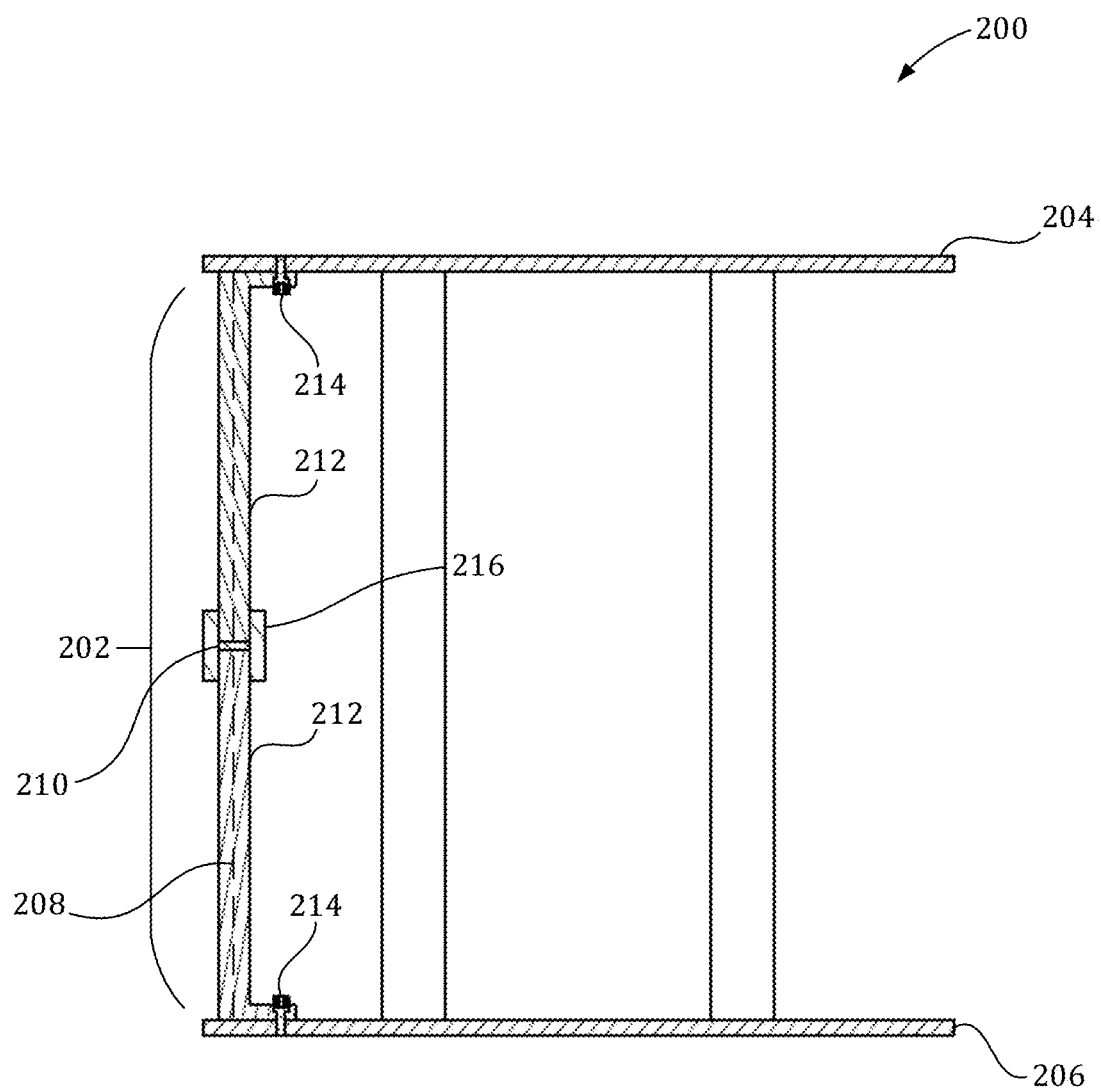
FIG. 2B is a schematic diagram, shown in cross-section, of the example heat switch of FIG. 2A.

Now referring to FIG. 2A, a schematic diagram is shown in perspective of an example heat switch 200 for a cryostat. A cross-sectional view of the example heat switch 200 is shown in FIG. 2B. The heat switch 200 includes a thermal linkage 202 configured to simultaneously contact a first thermal stage 204 and a second thermal stage 206 of the cryostat and define a thermal pathway 208 therebetween (see dashed line 208). FIGS. 2A & 2B depict the thermal pathway 208 as a single, straight pathway. However, this depiction is not intended as limiting. The thermal pathway 208 may be non-straight (e.g., curved, segmented, etc.) and include multiple pathways therein. The multiple pathways may diverge or converge along the thermal linkage 202 as set by characteristics such a shape of the thermal linkage 202, a number of components that define the thermal linkage 202, one or more thermal properties of the components, interfaces between the components, and so forth.

The thermal linkage 202 includes a superconducting element 210 disposed along a portion of the thermal pathway 208 and capable of transitioning between a superconducting state and a non-superconducting state. A thermal conductivity of the superconducting state is lower than a thermal conductivity of the non-superconducting state. The superconducting element 210 is formed of a superconducting material capable of entering a superconducting state below a superconducting critical temperature, such as a Type-I or Type-II superconductor. Examples of the superconducting material include lead and its alloys, indium and its alloys, tin and its alloys, thallium and its alloys, palladium and its alloys, and niobium and its alloys. For example, the superconducting element 210 may be formed of lead, which has a high thermal conductivity in a temperature range from 4 K to 10 K and a low thermal conductivity (i.e., two orders of magnitude lower) in a milli-Kelvin temperature range below its superconducting critical temperature (i.e., $T_{sc}$=7.19 K).

In some instances, the thermal conductivity of the superconducting state is no greater than one-third of the thermal conductivity of the non-superconducting state at 300 K. In some instances, the thermal conductivity of the superconducting state is no greater than one-fifth of the thermal conductivity of the non-superconducting state at 300 K. In some instances, the thermal conductivity of the superconducting state is no greater than one-tenth of the thermal conductivity of the non-superconducting state at 300 K. In some instances, the thermal conductivity of the superconducting state is no greater than one-twelfth of the thermal conductivity of the non-superconducting state at 300 K.

In some implementations, the superconducting element 210 includes a layer. The layer may be disposed at any position along the thermal pathway 208. For example, as shown in FIGS. 2A & 2B, the layer may be disposed at a midpoint of the thermal linkage 202. In some implementations, the superconducting element 210 includes a layer configured to contact a surface of the first thermal stage 204 or a surface of the second thermal stage 206. In these implementations, the layer may be disposed at an interface between the thermal linkage 202 and a thermal stage when the heat switch 200 is incorporated into the cryostat.

Although FIGS. 2A & 2B illustrate only one instance of the superconducting element 210 this illustration is not intended as limiting. In general, the thermal linkage 202 may include any number of superconducting elements and at any position within the thermal linkage 202 along the thermal pathway 208. Moreover, the superconducting element 208 may have any shape as necessary to interrupt a continuity of the thermal pathway 208.

The thermal linkage 202 may include a thermally-conductive element 212 having a thermal conductivity of at least 1 W/(m·K) at 4 K. For example, the thermally-conductive element 212 may be formed of oxygen-free high conductivity copper and its alloys (e.g., C101 copper alloy) with a high residual resistivity ratio (RRR). The thermally-conductive element 212 may be formed into a rod, a tube, a cylinder, a braid or other woven article, a sheet, or a truss. Other forms are possible, including combinations of forms. FIGS. 2A & 2B depict two thermally-conductive elements 212. However, this depiction is for purposes of illustration only. The heat switch 200 may optionally include an electric heater configured to supply heat to the thermally-conductive element. The electric heater may be operable to alter a thermal conductivity of the thermally-conductive element 212 by altering a temperature of the thermally-conductive element 212 (or some portion thereof). In some instances, such as shown in FIGS. 2A & 2B, the thermally-conductive element 212 includes a cylindrical body (e.g., a rod, a tube, a cylinder, etc.). In some instances, the thermally-conductive element 212 includes a braided body (e.g., a cloth, a fabric, a braid, etc.).

In some implementations, the heat switch 200 includes a fastener 214 configured to couple the thermal linkage 202 to the first thermal stage 204 or the second thermal stage 206. The fastener 214 is operable to apply a clamping force to the thermal linkage 202, thereby improving contact between the thermal linkage 202 and a corresponding thermal stage. This improved contact may also improve a conduction of heat across an interface between the thermal linkage 202 and the corresponding stage. The fastener 214 may be configured to allow selective coupling and de-coupling of the thermal linkage 202 from the thermal stages, such as common to a threaded fastener. For example, as shown in FIGS. 2A & 2B, the heat switch 200 may include a first socket cap screw to couple the thermal linkage 202 to the first thermal stage 204 and a second socket cap screw to couple the thermal linkage 202 to the second thermal stage 206. However, other types of fasteners are possible (e.g., latches, brads, pins, etc.).

In some implementations, shown in FIGS. 2A & 2B, the heat switch 200 includes an electric heater 216 configured to supply heat to the superconducting element 210. The electric heater 216 may be in direct contact with the superconducting element 210 and coupled thereto through a fastener (e.g., a screw, a rivet, a clamp, etc.), a weld joint, or a braze joint. Other means of coupling are possible. The electric heater 216 is operable to heat a superconducting material forming the superconducting element 210 above its superconducting critical temperature, thus inducing the superconducting element 210 to exit the superconducting state and enter the non-superconducting state.

In some implementations, the heat switch 200 includes an electromagnet configured to apply a magnetic field to the superconducting element 210. Like the electric heater 216, the electromagnet may be disposed proximate the superconducting element 210 (e.g., adjacent, wrapped-around, etc.). The electromagnet may optionally include superconducting wire to minimize heat produced by electrical current generating the magnetic field. In such implementations, the electromagnet is operable to apply the magnetic field at a magnitude at or above a superconducting critical magnetic field of a superconducting material forming the superconducting element 210. In response, the superconducting element 210 exits the superconducting state and enters the non-superconducting state.

It will be appreciated that the heat switch 200 may be incorporated within a cryostat, such as shown in FIGS. 2A & 2B. The heat switch 200 may then include the first thermal stage 204 and the second thermal stage 206 of the cryostat. When incorporated within the cryostat, the thermal linkage 202 is in simultaneous contact with the first thermal stage 204 and the second thermal stage 206. The first thermal stage 204 may be configured to operate at a first temperature, and the second thermal stage 206 may be configured to operate at a second temperature lower than the first temperature. In some instances, second thermal stage 206 is cooled to a temperature no greater than 10 K. In some instances, the second thermal stage 206 is cooled to a temperature no greater than 10 K and the first thermal stage 204 is cooled to a temperature no greater than 75 K.

The heat switch 200 may also be incorporated into the cryostat to couple any combination of two or more thermal stages. As such, the first thermal stage 204 and the second thermal stage 206 may correspond to adjacent thermal stages or thermal stages separated by one or more other thermal stages. The first thermal stage 204 and the second thermal stage 206 may also correspond to two thermal stages in a grouping of three or more thermal stages coupled by the heat switch 200. In some instances, such as shown in FIGS. 2A & 2B, the cryostat includes a spatial sequence of thermal stages and the first thermal stage 204 and the second thermal stage 206 are adjacent each other in the spatial sequence of thermal stages. In other instances, the cryostat comprises a spatial sequence of thermal stages and the first thermal stage 204 and the second thermal stage 206 are separated by at least one thermal stage in the spatial sequence of thermal stages.

In operation, the heat switch 200 controls a flow of heat from a heat source to a heat sink. To do so, the heat switch 200 selectively transitions between an "on" state, where heat flows from a heat source to a heat sink, and an "off" state, where the flow of heat is substantially reduced or eliminated. The heat source and the heat sink may each correspond to one or more thermal stages in a cryostat (e.g., a spatial sequence of thermal stages within the cryostat)), a device or sample on a thermal stage, or some combination thereof. The flow of heat traverses along a warm-to-cool temperature gradient and at a magnitude driven by a temperature difference between the heat source and the heat sink.

During operation of the cryostat, the heat switch 200 may be cooled to cryogenic temperatures (e.g., T<120 K) below the superconducting critical temperature associated with the superconducting element 210. As such, the superconducting element 210 enters the superconducting state and decreases in thermal conductivity. This decrease imparts thermal resistance along the thermal pathway 208, thereby transitioning the heat switch 200 into the "off" state. For heat to traverse the thermal linkage 202, the heat switch 200 may be selectively activated into the "on" state by energizing the electric heater 216. The electric heater 216 applies heat to the superconducting element 210 to raise its temperature above the superconducting critical temperature. In response, the superconducting element 210 enters the non-superconducting state and increases in thermal conductivity. This increase removes thermal resistance along the thermal pathway 208 and thus transitions the heat switch 200 into the "on" state. It will be appreciated that, because the heat switch 200 operates without being physically moved, the heat switch 200 may be considered a "passive" heat switch.

In some variations, the heat switch 200 may use an electromagnet to transition the superconducting element 210 between the superconducting state and the non-superconducting state. In these variations, the electromagnet may supplement the electric heater 216, or alternatively, replace the electric heater 216. During operation, the electromagnet applies a magnetic field to the superconducting element 210 at a magnitude equal to or greater than the superconducting critical magnetic field associated with the superconducting element 210. In response, the superconducting element 210 exits the superconducting state and enters the non-superconducting state. De-energizing the electromagnet removes the magnetic field, allowing the superconducting element 210 to return to the superconducting state. It will be appreciated that the electromagnet provides a non-thermal means to transition the superconducting element 210 between the superconducting state and the non-superconducting state. As such, heat from the electric heater 216 may be reduced or eliminated, thereby reducing a thermal load that must otherwise be processes by refrigeration systems of the cryostat.

Selective activation of the heat switch 200 allows a flow of heat to be transferred between the first thermal stage 204 and the second thermal stage 206. For example, during cooling of the cryostat, the second thermal stage 206 may thermally lag (in temperature) the first thermal stage 204. This thermal lag may result from thermally-insulating characteristics of structural supports between the first and second thermal stages 204, 206. Cooling of the second thermal stage 206 may be accelerated by activating the heat switch 200 into "on" state. This activation may allow refrigeration systems associated with the first and second thermal stages 204, 206 to operate in tandem, thereby improving a heat extraction rate from the second thermal stage 206. In another example, the heat switch 200 may also be selectively activated during heating of the cryostat, such as when the first and second thermal stages 204, 206 of the cryostat are brought to room temperature from cryogenic temperatures. During heating, the second thermal stage 206 may also thermally lag (in temperature) the first thermal stage 204. This thermal lag may be mitigated by activating the heat switch 200 into "on" state, thereby increase a supply rate of heat to the second thermal stage 206. In yet another example, the heat switch 200 may be activated to adjust an operating temperature of the first thermal stage 204, the second thermal stage 206, or both, to bring a device or sample to a target temperature.

According to an implementation, a method for controlling a flow of heat between thermal stages of a cryostat includes contacting a thermal linkage to a first thermal stage and a second thermal stage of the cryostat to establish a thermal pathway therebetween. The thermal linkage includes a superconducting element disposed along a portion of the thermal pathway. The method also includes altering a first temperature of the first thermal stage and altering a second temperature of the second thermal stage. The method additionally includes selectively transitioning the superconducting element between a superconducting state, where a flow of heat between the first thermal stage and the second thermal stage is decreased, and a non-superconducting state, where a flow of heat between the first thermal stage and the second thermal stage is increased. In some instances, the cryostat includes a spatial sequence of thermal stages and the first thermal stage and the second thermal stage are adjacent each other in the spatial sequence of thermal stages. In other instances, the cryostat includes a spatial sequence of thermal stages and the first thermal stage and the second thermal stage are separated by at least one thermal stage in the spatial sequence of thermal stages.

In some implementations, selectively transitioning the superconducting element includes cooling the superconducting element at or below a superconducting critical temperature to enter the superconducting state and heating the superconducting element above the superconducting critical temperature to enter the non-superconducting state. In further implementations, selectively transitioning the superconducting element may also include applying a magnetic field to the superconducting element. A magnitude of the applied magnetic field may be increased to at least a superconducting critical magnetic field, thereby inducing the superconducting element to enter the non-superconducting state. The magnitude of the applied magnetic field may also be decreased to below the superconducting critical magnetic field, thereby inducing the superconducting element to enter the superconducting state.

In some implementations, altering the first temperature of the first thermal stage includes cooling the first thermal stage and altering the second temperature of the second thermal stage includes cooling the second thermal stage. In these implementations, transitioning the superconducting element includes transferring heat from the second thermal stage to the first thermal stage when the superconducting element is in the non-superconducting state. In some instances, the second thermal stage is cooled to a temperature no greater than 10 K. In other instances, the second thermal stage is cooled to a temperature no greater than 10 K and the first thermal stage is cooled to a temperature no greater than 75 K.

In some implementations, altering the first temperature of the first thermal stage includes heating the first thermal stage and altering the second temperature of the second thermal stage includes heating the second thermal stage. In these implementations, transitioning the superconducting element includes transferring heat from the first thermal stage to the second thermal stage when the superconducting element is in the non-superconducting state. In some instances, the second thermal stage is heated from a temperature no greater than 10 K. In other instances, the second thermal stage is heated from a temperature no greater than 10 K and the first thermal stage is heated from a temperature no greater than 75 K.

Figure 3A:
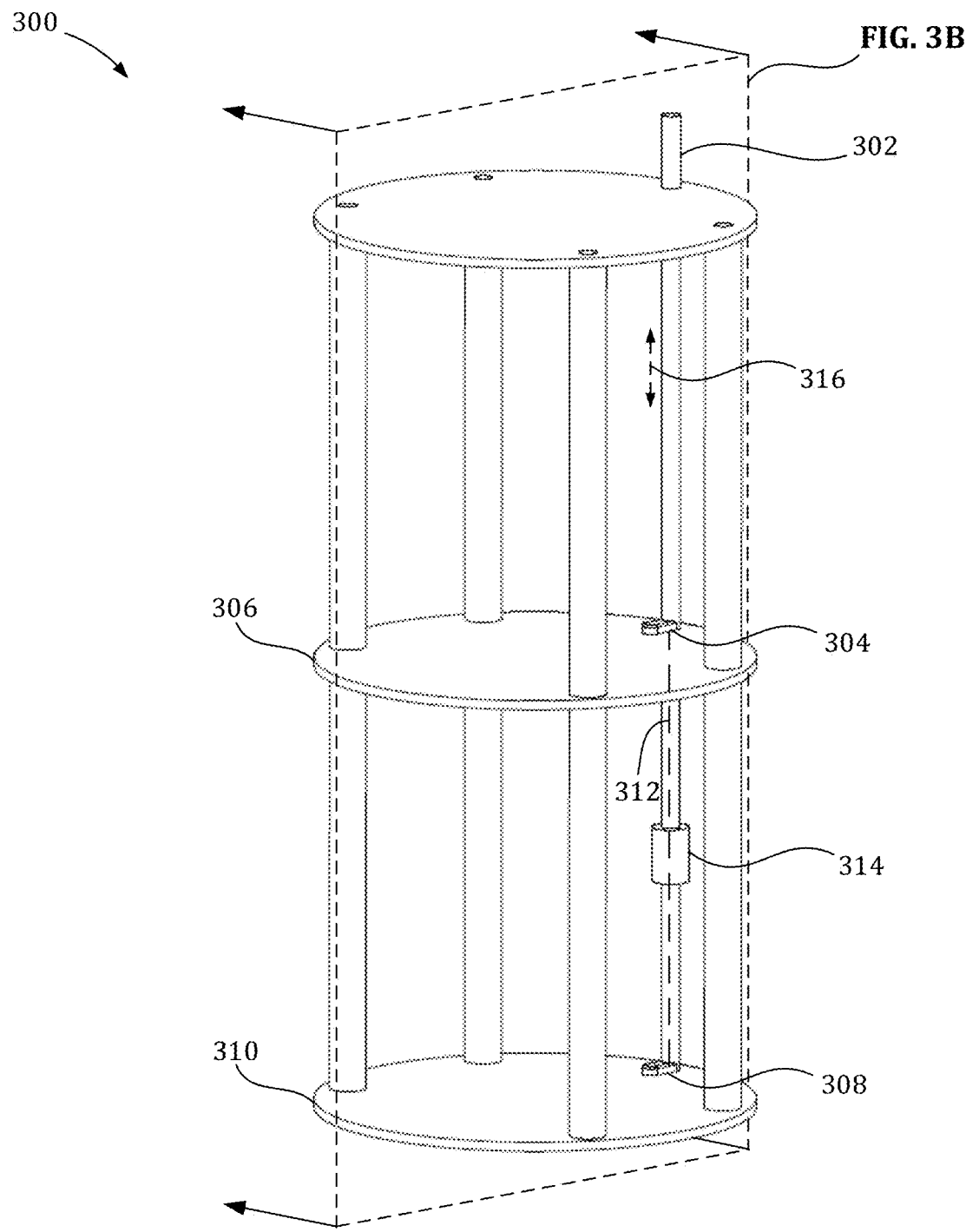
FIG. 3A is a schematic diagram, shown in perspective, of an example heat switch for a cryostat.
Figure 3B:
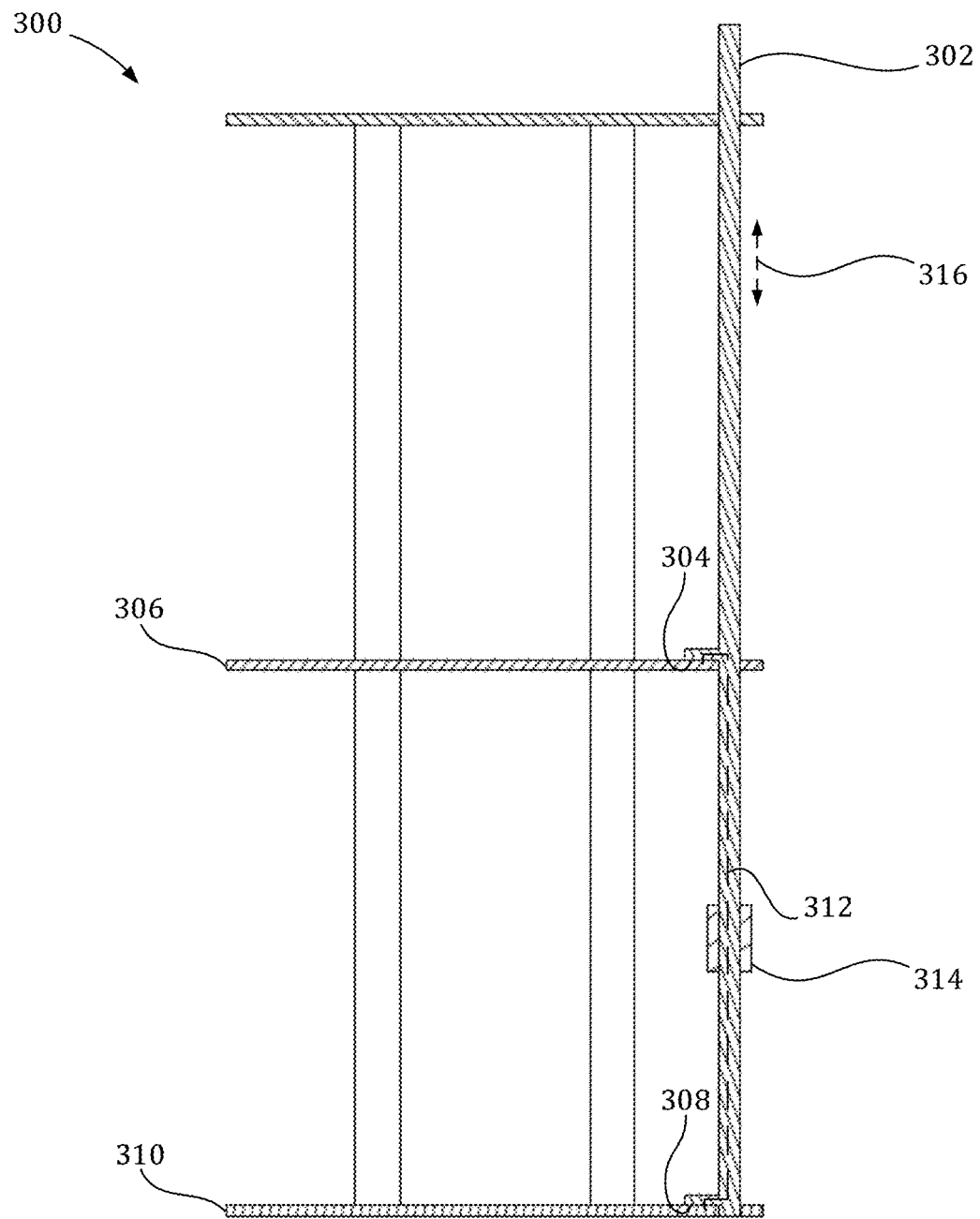
FIG. 3B is a schematic diagram, shown in cross-section, of the example heat switch of FIG. 3A.

Now referring to FIG. 3A, a schematic diagram is shown in perspective of an example heat switch 300 for a cryostat. A cross-sectional view of the example heat switch 300 is shown in FIG. 3B. The heat switch 300 includes a thermal linkage 302 having a first surface 304 configured to contact a first thermal stage 306 of the cryostat and a second surface 308 configured to contact a second thermal stage 310 of the cryostat. The thermal linkage 302 is operable to selectively move between a first position, where the thermal linkage simultaneously contacts the first thermal stage 306 and the second thermal stage 310 and defines a thermal pathway 312 therebetween, and a second position, where the thermal linkage 302 is not contact with at least one of the first thermal stage 306 and the second thermal stage 310 and the thermal pathway 312 is broken. FIGS. 3A & 3B depict the thermal linkage 302 in the first position. However, this depiction is for purposes of illustration only. Other positions of the thermal linkage 302 are possible.

FIGS. 3A & 3B depict the thermal pathway 312 as a single, straight pathway. However, this depiction is not intended as limiting. The thermal pathway 312 may be non-straight (e.g., curved, segmented, etc.) and include multiple pathways therein. The multiple pathways may diverge or converge along the thermal linkage 302 as set by characteristics such a shape of the thermal linkage 302, a number of components that define the thermal linkage 302, one or more thermal properties of the components, interfaces between the components, and so forth.

In some implementations, the thermal linkage 302 is formed of a material having a thermal conductivity of at least 1 W/(m·K) at 4 K. For example, the thermal linkage 302 may be formed of oxygen-free high conductivity copper and its alloys (e.g., C101 copper alloy) with a high residual resistivity ratio (RRR). The thermal linkage 302 may be formed into a rod, a tube, a cylinder, a braid or other woven article, a sheet, or a truss. Other forms are possible, including combinations of forms. The heat switch 300 may optionally include an electric heater 314 configured to supply heat to the thermally-conductive element. The electric heater 314 may be operable to alter a thermal conductivity of the thermal linkage 302 by altering a temperature of one or more portions thereon. In some instances, such as shown in FIGS. 3A & 3B, the material includes a cylindrical body (e.g., a rod, a tube, a cylinder, etc.). In some instances, the material includes a braided body (e.g., a cloth, a fabric, a braid, etc.).

In some implementations, the thermal linkage 302 is configured to move linearly between the first position and the second position (see dashed arrow 316). In other implementations, the thermal linkage is configured to rotate between the first position and the second position. In some implementations, the thermal linkage 302 is configured to both move linearly and rotate between the first position and the second position.

In some implementations, the heat switch 300 is configured such that the thermal linkage 302 is moved manually by an operator between the first position and the second position. In some implementations, the heat switch 300 includes an actuator coupled to the thermal linkage 302 and operable to move the thermal linkage 302 between the first position and the second position. For example, the heat switch 300 may include an electric motor coupled to a shaft of the thermal linkage 302.

In some embodiments, the heat switch 300 includes an actuator coupled to the thermal linkage 302 and also includes a thermally-insulating element coupling the actuator to the thermal linkage 302. The thermally-insulating element is operable to impede flows of heat from the actuator to the thermal linkage 302 (and vice versa). This behavior may reduce a rate of heat transfer from upper thermal stages of the cryostat to colder, lower thermal stages of the cryostat. The behavior may also reduce a rate of heat transfer from an outer vacuum chamber encapsulating the cryostat to the colder, lower thermal stages of the cryostat. The thermally-insulating element may be formed of a material having a thermal conductivity less than 0.5 W/(m·K) at or below 50 K. For example, thermally-insulating element may be formed of a glass-epoxy laminate of G10 grade per specifications of the National Electronic Manufacturers Association (NEMA). The thermally-insulating element 302 may be formed into a rod, a tube, a cylinder, a braid, or other woven article. Other forms are possible, including combinations of forms. In some instances, the material includes a cylindrical body (e.g., a rod, a tube, a cylinder, etc.). In some instances, the material includes a braided body (e.g., a cloth, a fabric, a braid, etc.).

It will be understood that the heat switch 300 may be incorporated within a cryostat, such as shown in FIGS. 3A &3. The heat switch 300 may then include the first thermal stage 306 and the second thermal stage 310 of the cryostat. The first thermal stage 306 may be configured to operate at a first temperature, and the second thermal stage 310 may be configured to operate at a second temperature lower than the first temperature. In some instances, second thermal stage 310 is cooled to a temperature no greater than 10 K. In some instances, the second thermal stage 310 is cooled to a temperature no greater than 10 K and the first thermal stage 306 is cooled to a temperature no greater than 75 K.

The heat switch 300 may also be incorporated into the cryostat to couple any combination of two or more thermal stages. As such, the first thermal stage 306 and the second thermal stage 310 may correspond to adjacent thermal stages or thermal stages separated by one or more other thermal stages. The first thermal stage 306 and the second thermal stage 310 may also correspond to two thermal stages in a grouping of three or more thermal stages coupled by the heat switch 300. In some instances, such as shown in FIGS. 3A & 3B, the cryostat includes a spatial sequence of thermal stages and the first thermal stage 306 and the second thermal stage 310 are adjacent each other in the spatial sequence of thermal stages. In other instances, the cryostat comprises a spatial sequence of thermal stages and the first thermal stage 306 and the second thermal stage 310 are separated by at least one thermal stage in the spatial sequence of thermal stages.

In operation, the heat switch 300 controls a flow of heat from a heat source to a heat sink. To do so, the heat switch 300 selectively transitions between an "on" state, where heat flows from a heat source to a heat sink, and an "off" state, where the flow of heat is substantially reduced or eliminated. The heat source and the heat sink may each correspond to one or more thermal stages in a cryostat (e.g., a spatial sequence of thermal stages within the cryostat), a device or sample on a thermal stage, or some combination thereof. The flow of heat traverses along a warm-to-cool temperature gradient and at a magnitude driven by a temperature difference between the heat source and the heat sink.

During operation of the cryostat, the heat switch 300 may be cooled to cryogenic temperatures (e.g., T<120 K) below the superconducting critical temperature associated with the superconducting element 210. To transition into the "on" state, the heat switch 300 may move into the first position, thereby establishing the thermal pathway 312 between the first thermal stage 306 and the second thermal stage 310. Such movement may occur in response to manual operation by an operator or via an actuator. In particular, the first surface 304 of the thermal linkage 302 contacts the first thermal stage 306 and the second surface 308 contacts the second thermal stage 310. Due to the high thermal conductivity associated with the thermal linkage 302, heat may flow from the first thermal stage 306 to the second thermal stage 310 (or vice versa).

To transition into the "off" state, the heat switch 300 may move into the second position, where at least one of the first surface 304 and the second surface 308 is not in contact with, respectively, the first thermal stage 306 or the second thermal stage 310. Such movement may occur in response to manual operation by an operator or via an actuator. Because the thermal pathway 312 is broken, heat ceases to flow between the first thermal stage 306 and the second thermal stage 310. It will be appreciated that, because the heat switch 200 operates being physically moved, the heat switch 200 may be considered an "active" heat switch.

Selective activation of the heat switch 300 allows a flow of heat to be transferred between the first thermal stage 306 and the second thermal stage 310. For example, during cooling of the cryostat, the second thermal stage 310 may thermally lag (in temperature) the first thermal stage 306. This thermal lag may result from thermally-insulating characteristics of structural supports between the first and second thermal stages 306, 310. Cooling of the second thermal stage 310 may be accelerated by activating the heat switch 300 into "on" state. This activation may allow refrigeration systems associated with the first and second thermal stages 306, 310 to operate in tandem, thereby improving a heat extraction rate from the second thermal stage 310. In another example, the heat switch 300 may also be selectively activated during heating of the cryostat, such as when the first and second thermal stages 306, 310 of the cryostat are brought to room temperature from cryogenic temperatures. During heating, the second thermal stage 310 may also thermally lag (in temperature) the first thermal stage 306. This thermal lag may be mitigated by activating the heat switch 300 into "on" state, thereby increase a supply rate of heat to the second thermal stage 310. In yet another example, the heat switch 300 may be activated to adjust an operating temperature of the first thermal stage 306, the second thermal stage 310, or both, to bring a device or sample to a target temperature.

In some implementations, a thermally-conductive element is disposed between the first surface 304 of the thermal linkage 302 and the first thermal stage 306, disposed between the second surface 308 of the thermal linkage 302 and the second thermal stage 310, or both. The thermally-conductive element is operable to improve heat transfer across an interface defined by mating surfaces of the thermal linkage 302 and a corresponding thermal stage. The thermally-conductive element may be formed of a material having a thermal conductivity of at least 1 W/(m·K) at 4 K, such as oxygen-free high conductivity copper and its alloys (e.g., C101 copper alloy) with a high residual resistivity ratio (RRR). In some instances, the thermally-conductive element includes a braided body (e.g., a cloth, a fabric, a braid, a loop, etc.).

Figure 4A:
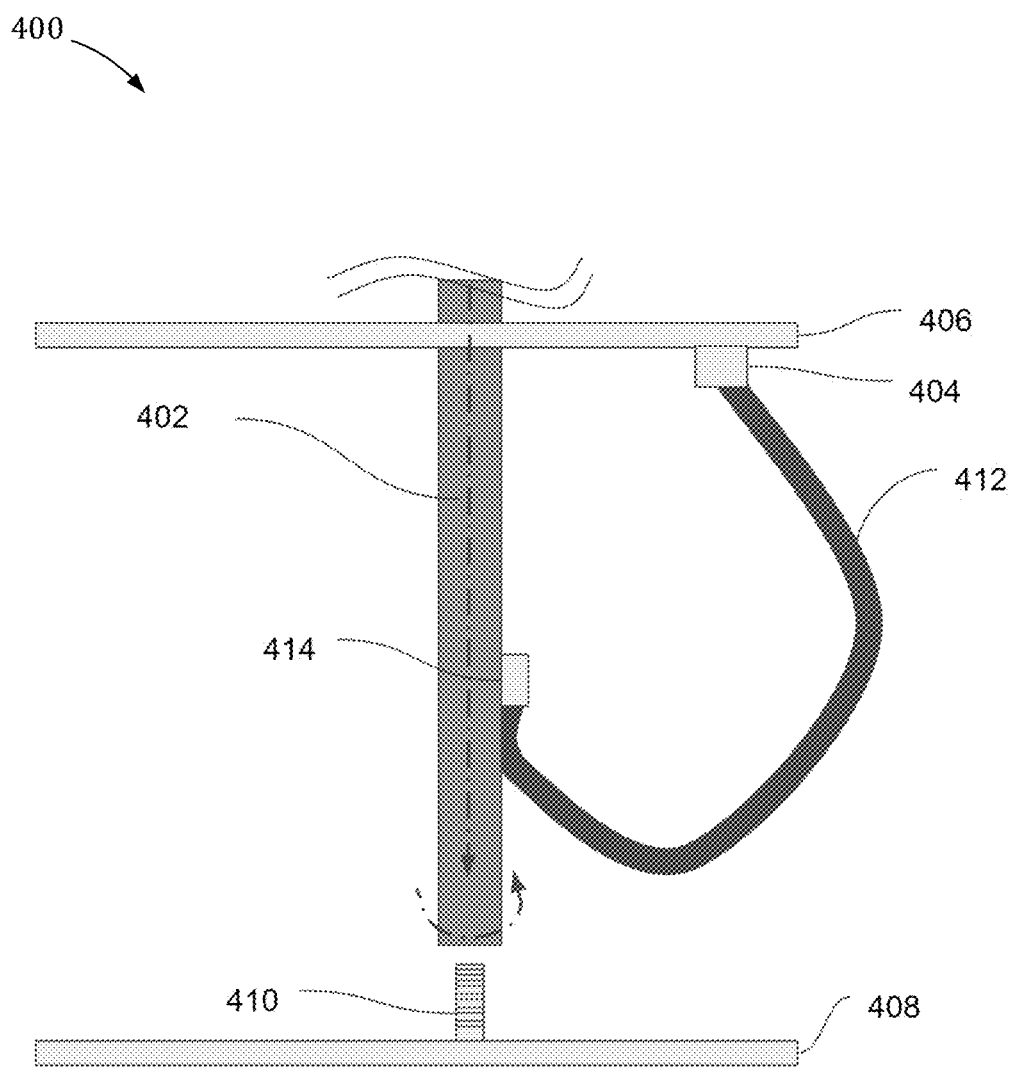
FIG. 4A is a schematic diagram, shown in cross-section, of an example heat switch in an "off" state and having a thermal linkage that includes a braided body.
Figure 4B:
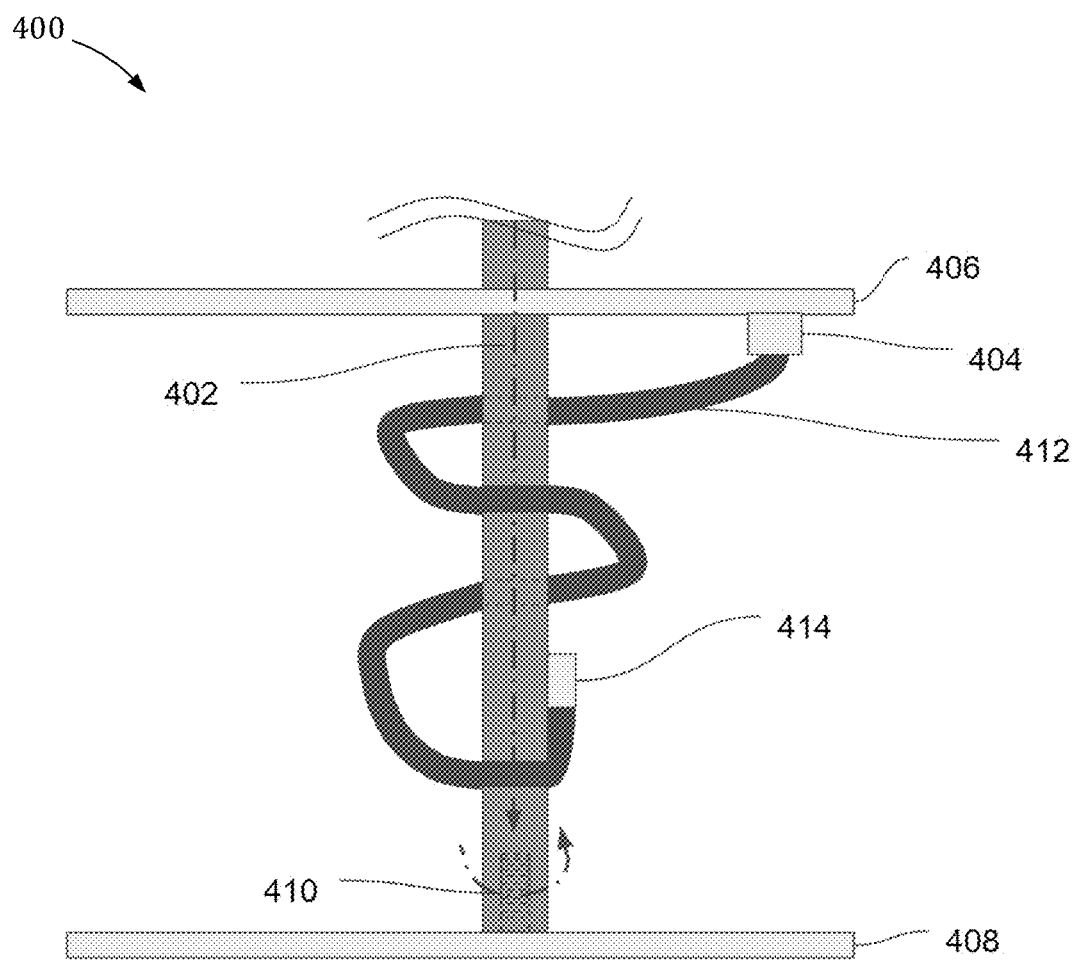
FIG. 4B is a schematic diagram, shown in cross-section, of the example heat switch of FIG. 4A, but in which the heat switch is in an "on" state.

Now referring to FIG. 4A, a schematic diagram is presented in cross-section of a heat switch 400 in an "off" state and having a thermal linkage 402 that includes a braided body. FIG. 4B presents the heat switch 400 of FIG. 4A, but in an "on" state. The heat switch 400 includes a thermally conductive element 402 that is thermally-connected to a first thermal stage 406 using a thermally conductive braid 412. The thermally-conductive braid 412 is attached at both ends by thermally-conductive couplings 404, 414 to the first thermal stage and rod, respectively. The thermally-conductive element 402 can move linearly as well as rotate. The heat switch 400 depicted in FIG. 4A is in the "off" state as the thermally conductive element 402 is not fastened into the threaded, thermal anchor 410, which is thermally connected to the second thermal stage 408. This configuration does not create a thermal pathway between the first thermal stage 406 and the second thermal stage 408. The heat switch 400 depicted in FIG. 4B is in the "on" state as the thermally conductive element 402 is fastened into the threaded, thermal anchor 410. When fastening the thermally conductive element 402 to the threaded, thermal anchor 410, a rotational motion will be generated. This rotational motion winds the thermally-conductive braid around the thermally conductive element 402. The use of a long thermally conductive braid 412 will allow fastening of the thermally conductive element 402 to the threaded thermal anchor 410. The "on" state creates a thermal short between the first thermal stage 406 and the second thermal stage 408.

According to an implementation, a method for controlling a flow of heat between thermal stages of a cryostat includes altering a first temperature of a first thermal stage of the cryostat and altering a second temperature of a second thermal stage of the cryostat. The method also includes selectively moving a thermal linkage between a first position, where the thermal linkage simultaneously contacts the first thermal stage and the second thermal stage and defines a thermal pathway therebetween, and a second position, where the thermal linkage is not contact with at least one of the first thermal stage and the second thermal stage and the thermal pathway is broken. In some instances, the cryostat includes a spatial sequence of thermal stages and the first thermal stage and the second thermal stage are adjacent each other in the spatial sequence of thermal stages. In other instances, the cryostat includes a spatial sequence of thermal stages and the first thermal stage and the second thermal stage are separated by at least one thermal stage in the spatial sequence of thermal stages.

In some implementations, selectively moving the thermal linkage includes moving the thermal linkage linearly between the first position and the second position. In some implementations, selectively moving the thermal linkage includes rotating the thermal linkage between the first position and the second position.

In some implementations, altering the first temperature of the first thermal stage includes cooling the first thermal stage and altering the second temperature of the second thermal stage includes cooling the second thermal stage. In these implementations, selectively moving the thermal linkage includes transferring heat from the second thermal stage to the first thermal stage when the thermal linkage is in the first position. In some instances, the second thermal stage is cooled to a temperature no greater than 10 K. In other instances, the second thermal stage is cooled to a temperature no greater than 10 K and the first thermal stage is cooled to a temperature no greater than 75 K.

In some implementations, altering the first temperature of the first thermal stage includes heating the first thermal stage and altering the second temperature of the second thermal stage includes heating the second thermal stage. In these implementations, selectively moving the thermal linkage includes transferring heat from the first thermal stage to the second thermal stage when the thermal linkage is in the first position. In some instances, the second thermal stage is heated from a temperature no greater than 10 K. In other instances, the second thermal stage is heated from a temperature no greater than 10 K and the first thermal stage is heated from a temperature no greater than 75 K.

It will be understood that implementations of the heat switches disclosed herein are not limited to a single instance per cryostat, as shown in FIGS. 2A-3B, but may also include multiple instances per cryostat. Moreover, any combination of active heat switches and passive heat switches may be used. For example, a cryostat may include a single active heat switch that defines a thermal pathway between two or more thermal stages. In another example, a cryostat may include a passive heat switch that defines a thermal pathway between a first thermal stage and a second thermal stage and an active heat switch that defines a thermal pathway between a third thermal stage and a fourth thermal stage. The second thermal stage and the third thermal stage may be shared in common. Other numbers, type combinations, and thermal-path configurations are possible.

Implementations of the heat switches described herein and methods for controlling a flow of heat between thermal stages of a cryostat of may also be described by the following non-limiting examples:

Example 1 A heat switch for a cryostat, comprising:
  a thermal linkage configured to simultaneously contact a first thermal stage and a second thermal stage of the cryostat and define a thermal pathway therebetween, the thermal linkage comprising:
    a superconducting element disposed along a portion of the thermal pathway and capable of transitioning between a superconducting state and a non-superconducting state, and
    wherein a thermal conductivity of the superconducting state is lower than a thermal conductivity of the non-superconducting state.

Example 2 The heat switch of example 1, wherein the thermal conductivity of the superconducting state is no greater than one-tenth of the thermal conductivity of the non-superconducting state at 300 K.

Example 3 The heat switch of example 1 or 2, wherein the thermal linkage comprises a thermally-conductive element having a thermal conductivity of at least 1 W/(m·K) at 4 K.

Example 4. The heat switch of example 3, wherein the thermally-conductive element comprises a cylindrical body.

Example 5. The heat switch of example 3 or 4, wherein the thermally-conductive element comprises a braided body.

Example 6. The heat switch of example 3 or any one of examples 4-5, comprising an electric heater configured to supply heat to the thermally-conductive element.

Example 7. The heat switch of claim 1 or any one of examples 2-6, comprising a fastener configured to couple the thermal linkage to the first thermal stage or the second thermal stage.

Example 8. The heat switch of example 1 or any one of examples 2-7, wherein the superconducting element comprises a layer.

Example 9. The heat switch of example 1 or any one of examples 2-7, wherein the superconducting element comprises a layer configured to contact a surface of the first thermal stage or a surface of the second thermal stage.

Example 10. The heat switch of example 1 or any one of examples 2-9, comprising an electric heater configured to supply heat to the superconducting element.

Example 11. The heat switch of example 1 or any one of examples 2-10, comprising an electromagnet configured to apply a magnetic field to the superconducting element.

Example 12. The heat switch of example 1 or any one of examples 2-11, comprising:
  the first thermal stage and the second thermal stage of the cryostat, the thermal linkage in simultaneous contact with the first thermal stage and the second thermal stage;
  wherein the first thermal stage is configured to operate at a first temperature; and
  wherein the second thermal stage is configured to operate at a second temperature lower than the first temperature.

Example 13. The heat switch of example 12, wherein the cryostat comprises a spatial sequence of thermal stages and the first thermal stage and the second thermal stage are adjacent each other in the spatial sequence of thermal stages.

Example 14. The heat switch of example 12, wherein the cryostat comprises a spatial sequence of thermal stages and the first thermal stage and the second thermal stage are separated by at least one thermal stage in the spatial sequence of thermal stages.

Example 15. The heat switch of example 12 or any one of examples 13-14, wherein the second temperature is no greater than 10 K.

Example 16. The heat switch of example 12 or any one of examples 13-14, wherein the second temperature is no greater than 10 K and the first temperature is no greater than 75 K.

Example 17. A method for controlling a flow of heat between thermal stages of a cryostat, the method comprising:
  contacting a thermal linkage to a first thermal stage and a second thermal stage of the cryostat to establish a thermal pathway therebetween, the thermal linkage comprising a superconducting element disposed along a portion of the thermal pathway;

altering a first temperature of the first thermal stage;
altering a second temperature of the second thermal stage; and
selectively transitioning the superconducting element between a superconducting state, where a flow of heat between the first thermal stage and the second thermal stage is decreased, and a non-superconducting state, where a flow of heat between the first thermal stage and the second thermal stage is increased.

Example 18. The method of example 17, wherein selectively transitioning the superconducting element comprises:
cooling the superconducting element at or below a superconducting critical temperature to enter the superconducting state; and
heating the superconducting element above the superconducting critical temperature to enter the non-superconducting state.

Example 19. The method of example 18, wherein selectively transitioning the superconducting element comprises:
applying a magnetic field to the superconducting element;
increasing a magnitude of the applied magnetic field to at least a superconducting critical magnetic field, thereby inducing the superconducting element to enter the non-superconducting state; and
decreasing the magnitude of the applied magnetic field to below the superconducting critical magnetic field, thereby inducing the superconducting element to enter the superconducting state.

Example 20. The method of example 17 or any one of examples 18-19,
wherein altering the first temperature of the first thermal stage comprises cooling the first thermal stage;
wherein altering the second temperature of the second thermal stage comprises cooling the second thermal stage; and
wherein transitioning the superconducting element comprises transferring heat from the second thermal stage to the first thermal stage when the superconducting element is in the non-superconducting state.

Example 21. The method of example 20, wherein second thermal stage is cooled to a temperature no greater than 10 K.

Example 22. The method of example 20, wherein the second thermal stage is cooled to a temperature no greater than 10 K and the first thermal stage is cooled to a temperature no greater than 75 K.

Example 23. The method of example 17 or any one of examples 18-19,
wherein altering the first temperature of the first thermal stage comprises heating the first thermal stage;
wherein altering the second temperature of the second thermal stage comprises heating the second thermal stage; and
wherein transitioning the superconducting element comprises transferring heat from the first thermal stage to the second thermal stage when the superconducting element is in the non-superconducting state.

Example 24. The method of example 23, wherein the second thermal stage is heated from a temperature no greater than 10 K.

Example 25. The method of example 23, wherein the second thermal stage is heated from a temperature no greater than 10 K and the first thermal stage is heated from a temperature no greater than 75 K.

Example 26. The method of claim 17 or any one of examples 18-25, wherein the cryostat comprises a spatial sequence of thermal stages and the first thermal stage and the second thermal stage are adjacent each other in the spatial sequence of thermal stages.

Example 27. The method of example 17 or any one of examples 18-25, wherein the cryostat comprises a spatial sequence of thermal stages and the first thermal stage and the second thermal stage are separated by at least one thermal stage in the spatial sequence of thermal stages.

Example 28. A heat switch for a cryostat, comprising:
a thermal linkage, comprising:
a first surface configured to contact a first thermal stage of the cryostat;
a second surface configured to contact a second thermal stage of the cryostat, and
wherein the thermal linkage is operable to selectively move between a first position, where the thermal linkage simultaneously contacts the first thermal stage and the second thermal stage and defines a thermal pathway therebetween, and a second position, where the thermal linkage is not contact with at least one of the first thermal stage and the second thermal stage and the thermal pathway is broken.

Example 29. The heat switch of example 28, wherein the thermal linkage is formed of a material having a thermal conductivity of at least 1 W/(m·K) at 4 K.

Example 30. The heat switch of example 29, wherein the material comprises a cylindrical body.

Example 31. The heat switch of example 29 or 30, wherein the material comprises a braided body.

Example 32. The heat switch of example 28 or any one of examples 29-31, wherein the thermal linkage is configured to move linearly between the first position and the second position.

Example 33. The heat switch of example 28 or any one of examples 29-32, wherein the thermal linkage is configured to rotate between the first position and the second position.

Example 34. The heat switch of example 28 or any one of examples 29-33, comprising:
an actuator coupled to the thermal linkage and operable to move the thermal linkage between the first position and the second position.

Example 35. The heat switch of example 28 or any one of examples 29-33, comprising:
an actuator operable to move the thermal linkage between the first position and the second position; and
a thermally-insulating element coupling the actuator to the thermal linkage.

Example 36. The heat switch of example 35, wherein the thermally-insulating element is formed of a material having a thermal conductivity less than 0.5 W/(m·K) at or below 50 K.

Example 37. The heat switch of example 35, wherein the thermally-insulating element comprises a cylindrical body.

Example 38. The heat switch of example 35 or 36, wherein the thermally-insulating element comprises a braided body.

Example 39. The heat switch of example 28 or any one of examples 29-38, comprising:
the first thermal stage and the second thermal stage of the cryostat;
wherein the first thermal stage is configured to operate at a first temperature; and
wherein the second thermal stage is configured to operate at a second temperature lower than the first temperature.

Example 40. The heat switch of example 39, wherein the cryostat comprises a spatial sequence of thermal stages and the first thermal stage and the second thermal stage are adjacent each other in the spatial sequence of thermal stages.

Example 41. The heat switch of example 39, wherein the cryostat comprises a spatial sequence of thermal stages and the first thermal stage and the second thermal stage are separated by at least one thermal stage in the spatial sequence of thermal stages.

Example 42. The heat switch of example 39 or any one of examples 40-41, wherein the second temperature is no greater than 10 K.

Example 43. The heat switch of example 39 or any one of examples 40-41, wherein the second temperature is no greater than 10 K and the first temperature is no greater than 75 K.

Example 44. The heat switch of example 39 or any one of examples 40-43, comprising:
  a thermally-conductive element disposed between the first surface of the thermal linkage and the first thermal stage or disposed between the second surface of the thermal linkage and the second thermal stage.

Example 45. The heat switch of example 39 or any one of examples 40-43, comprising
  a thermally-conductive element disposed between the first surface of the thermal linkage and the first thermal stage or disposed between the second surface of the thermal linkage and the second thermal stage; and
  wherein the thermally-conductive element is formed of a material having a thermal conductivity of at least 1 W/(m·K) at 4 K.

Example 46. A method for controlling a flow of heat between thermal stages of a cryostat, the method comprising:
  altering a first temperature of a first thermal stage of the cryostat;
  altering a second temperature of a second thermal stage of the cryostat; and
  selectively moving a thermal linkage between a first position, where the thermal linkage simultaneously contacts the first thermal stage and the second thermal stage and defines a thermal pathway therebetween, and a second position, where the thermal linkage is not contact with at least one of the first thermal stage and the second thermal stage and the thermal pathway is broken.

Example 47. The method of example 46, wherein selectively moving the thermal linkage comprises moving the thermal linkage linearly between the first position and the second position.

Example 48. The method of example 46 or 47, wherein selectively moving the thermal linkage comprises rotating the thermal linkage between the first position and the second position.

Example 49. The method of example 46 or any one of examples 47-48,
  wherein altering the first temperature of the first thermal stage comprises cooling the first thermal stage;
  wherein altering the second temperature of the second thermal stage comprises cooling the second thermal stage; and
  wherein selectively moving the thermal linkage comprises transferring heat from the second thermal stage to the first thermal stage when the thermal linkage is in the first position.

Example 50. The method of example 49, wherein the second thermal stage is cooled to a temperature no greater than 10 K.

Example 51. The method of example 49, wherein the second thermal stage is cooled to a temperature no greater than 10 K and the first thermal stage is cooled to a temperature no greater than 75 K.

Example 52. The method of example 46 or any one of examples 47-48,
  wherein altering the first temperature of the first thermal stage comprises heating the first thermal stage;
  wherein altering the second temperature of the second thermal stage comprises heating the second thermal stage; and
  wherein selectively moving the thermal linkage comprises transferring heat from the first thermal stage to the second thermal stage when the thermal linkage is in the first position.

Example 53. The method of example 52, wherein the second thermal stage is heated from a temperature no greater than 10 K.

Example 54. The method of example 52, wherein the second thermal stage is heated from a temperature no greater than 10 K and the first thermal stage is heated from a temperature no greater than 75 K.

Example 55. The method of example 46 or any one of examples 47-54, wherein the cryostat comprises a spatial sequence of thermal stages and the first thermal stage and the second thermal stage are adjacent each other in the spatial sequence of thermal stages.

Example 56. The method of claim 46 or any one of examples 47-54, wherein the cryostat comprises a spatial sequence of thermal stages and the first thermal stage and the second thermal stage are separated by at least one thermal stage in the spatial sequence of thermal stages.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described herein. Nevertheless, it will be understood that various modifications can be made to these embodiments. Accordingly, other embodiments are within the scope of the following claims.

What is claimed is:

1. A heat switch for a cryostat, comprising:
  a thermal linkage, comprising:
    a first surface configured to contact a first thermal stage of the cryostat;

a second surface configured to contact a second thermal stage of the cryostat, and wherein the thermal linkage is operable to selectively move between a first position, where the thermal linkage simultaneously contacts the first thermal stage and the second thermal stage and defines a thermal pathway therebetween, and a second position, where the thermal linkage is not in contact with the first thermal stage and not in contact with the second thermal stage and the thermal pathway is broken.

2. The heat switch of claim 1, wherein the thermal linkage is formed of a material having a thermal conductivity of at least 1 W/(m·K) at 4 K.

3. The heat switch of claim 1, wherein the thermal linkage is configured to move linearly between the first position and the second position.

4. The heat switch of claim 1, wherein the thermal linkage is configured to rotate between the first position and the second position.

5. The heat switch of claim 1, comprising:
an actuator operable to move the thermal linkage between the first position and the second position; and
a thermally-insulating element coupling the actuator to the thermal linkage.

6. The heat switch of claim 5, wherein the thermally-insulating element is formed of a material having a thermal conductivity less than 0.5 W/(m·K) at or below 50 K.

7. The heat switch of claim 1,
wherein the first thermal stage is configured to operate at a first temperature; and
the second thermal stage is configured to operate at a second temperature lower than the first temperature.

8. The heat switch of claim 7, wherein the cryostat comprises a spatial sequence of thermal stages, and the first thermal stage and the second thermal stage are separated by at least one thermal stage in the spatial sequence of thermal stages.

9. The heat switch of claim 7, wherein the second temperature is equal to or less than 10 K.

10. The heat switch of claim 7, comprising one or both of:
a first thermally-conductive element disposed between the first surface of the thermal linkage and the first thermal stage; and
a second thermally-conductive element disposed between the second surface of the thermal linkage and the second thermal stage.

11. A method for controlling a flow of heat between thermal stages of a cryostat, the method comprising:
altering a first temperature of a first thermal stage of the cryostat;
altering a second temperature of a second thermal stage of the cryostat; and
selectively moving a thermal linkage between a first position, where the thermal linkage simultaneously contacts the first thermal stage and the second thermal stage and defines a thermal pathway therebetween, and a second position, where the thermal linkage is not in contact with the first thermal stage and not in contact with the second thermal stage and the thermal pathway is broken.

12. The method of claim 11, wherein selectively moving the thermal linkage comprises moving the thermal linkage linearly between the first position and the second position.

13. The method of claim 11, wherein selectively moving the thermal linkage comprises rotating the thermal linkage between the first position and the second position.

14. The method of claim 11,
wherein altering the first temperature of the first thermal stage comprises cooling the first thermal stage;
wherein altering the second temperature of the second thermal stage comprises cooling the second thermal stage; and
wherein selectively moving the thermal linkage comprises transferring heat from the second thermal stage to the first thermal stage when the thermal linkage is in the first position.

15. The method of claim 14, wherein the second thermal stage is cooled to a temperature equal to or less than 10 K.

16. The method of claim 11,
wherein altering the first temperature of the first thermal stage comprises heating the first thermal stage;
wherein altering the second temperature of the second thermal stage comprises heating the second thermal stage; and
wherein selectively moving the thermal linkage comprises transferring heat from the first thermal stage to the second thermal stage when the thermal linkage is in the first position.

17. The method of claim 16, wherein the second thermal stage is heated from a temperature equal to or less than 10 K.

18. The heat switch of claim 2, wherein the material comprises a cylindrical body.

19. The heat switch of claim 2, wherein the material comprises a braided body.

20. The heat switch of claim 1, comprising:
an actuator coupled to the thermal linkage and operable to move the thermal linkage between the first position and the second position.

21. The heat switch of claim 5, wherein the thermally-insulating element comprises a cylindrical body.

22. The heat switch of claim 5, wherein the thermally-insulating element comprises a braided body.

23. The heat switch of claim 7, wherein the cryostat comprises a spatial sequence of thermal stages, and the first thermal stage and the second thermal stage are adjacent to each other in the spatial sequence of thermal stages.

24. The heat switch of claim 7, wherein the second temperature is equal to or less than 10 K and the first temperature is equal to or less than 75 K.

25. The heat switch of claim 7, comprising:
a thermally-conductive element disposed between the first surface of the thermal linkage and the first thermal stage or disposed between the second surface of the thermal linkage and the second thermal stage; and
wherein the thermally-conductive element is formed of a material having a thermal conductivity of at least 1 W/(m·K) at 4 K.

26. The method of claim 14, wherein the second thermal stage is cooled to a temperature equal to or less than 10 K and the first thermal stage is cooled to a temperature equal to or less than 75 K.

27. The method of claim 16, wherein the second thermal stage is heated from a temperature equal to or less than 10 K and the first thermal stage is heated from a temperature equal to or less than 75 K.

28. The method of claim 11, wherein the cryostat comprises a spatial sequence of thermal stages, and the first thermal stage and the second thermal stage are adjacent to each other in the spatial sequence of thermal stages.

29. The method of claim 11, wherein the cryostat comprises a spatial sequence of thermal stages, and the first thermal stage and the second thermal stage are separated by at least one thermal stage in the spatial sequence of thermal stages.

* * * * *